US006182447B1

(12) United States Patent
    Hashimura et al.

(10) Patent No.: US 6,182,447 B1
(45) Date of Patent: Feb. 6, 2001

(54) EXHAUST PIPE STRUCTURE FOR VEHICLE

(75) Inventors: Tadayoshi Hashimura; Naoki Uchida, both of Kanagawa-ken; Hiroki Takishima, Tokyo, all of (JP)

(73) Assignee: Nissan Motor Co., Ltd., Kanagawa-Ken (JP)

( * ) Notice: Under 35 U.S.C. 154(b), the term of this patent shall be extended for 0 days.

(21) Appl. No.: 09/221,135

(22) Filed: Dec. 28, 1998

(30) Foreign Application Priority Data

Dec. 26, 1997 (JP) .................................................. 9-361456

(51) Int. Cl.⁷ ....................................................... F01N 7/10
(52) U.S. Cl. ................................. 60/323; 60/302; 60/322
(58) Field of Search ............................... 60/323, 322, 302

(56) References Cited

U.S. PATENT DOCUMENTS

| 5,129,476 | * | 7/1992 | Kikuchi et al. | 180/234 |
| 5,325,666 | * | 7/1994 | Rutschmann | 60/302 |
| 5,398,504 | * | 3/1995 | Hirota et al. | 60/302 |
| 5,438,830 | * | 8/1995 | Matsumura | 60/302 |
| 5,582,004 | * | 12/1996 | Rutschmann | 60/288 |

FOREIGN PATENT DOCUMENTS

| 60-50216 | | 3/1985 | (JP) . |
| 410252492A | * | 9/1998 | (JP) . |

* cited by examiner

Primary Examiner—Thomas Denion
Assistant Examiner—Thai-Ba Trieu
(74) Attorney, Agent, or Firm—McDermott, Will & Emery

(57) ABSTRACT

A front exhaust pipe is connected to a front engine block, and a rear exhaust pipe is connected to a rear engine block. The front exhaust pipe extends from the front engine block downward, and curves and extends rearward. The rear exhaust pipe includes an upstream portion extending downward from a rear portion of the engine and a downstream portion extending forward from a lower end of the upstream portion and curving rearward. Rear ends of the front and rear exhaust pipes are joined together and connected to a main exhaust pipe. The rear and front exhaust pipe have substantially the same length. Therefore, vibration due to a difference between natural frequencies of front and rear exhaust pipes is reduced, and sound vibration performance is enhanced. Further, a declination of output due to disorder of exhaust pulsation in the confluence portion of the front and rear exhaust pipes is avoided.

9 Claims, 3 Drawing Sheets

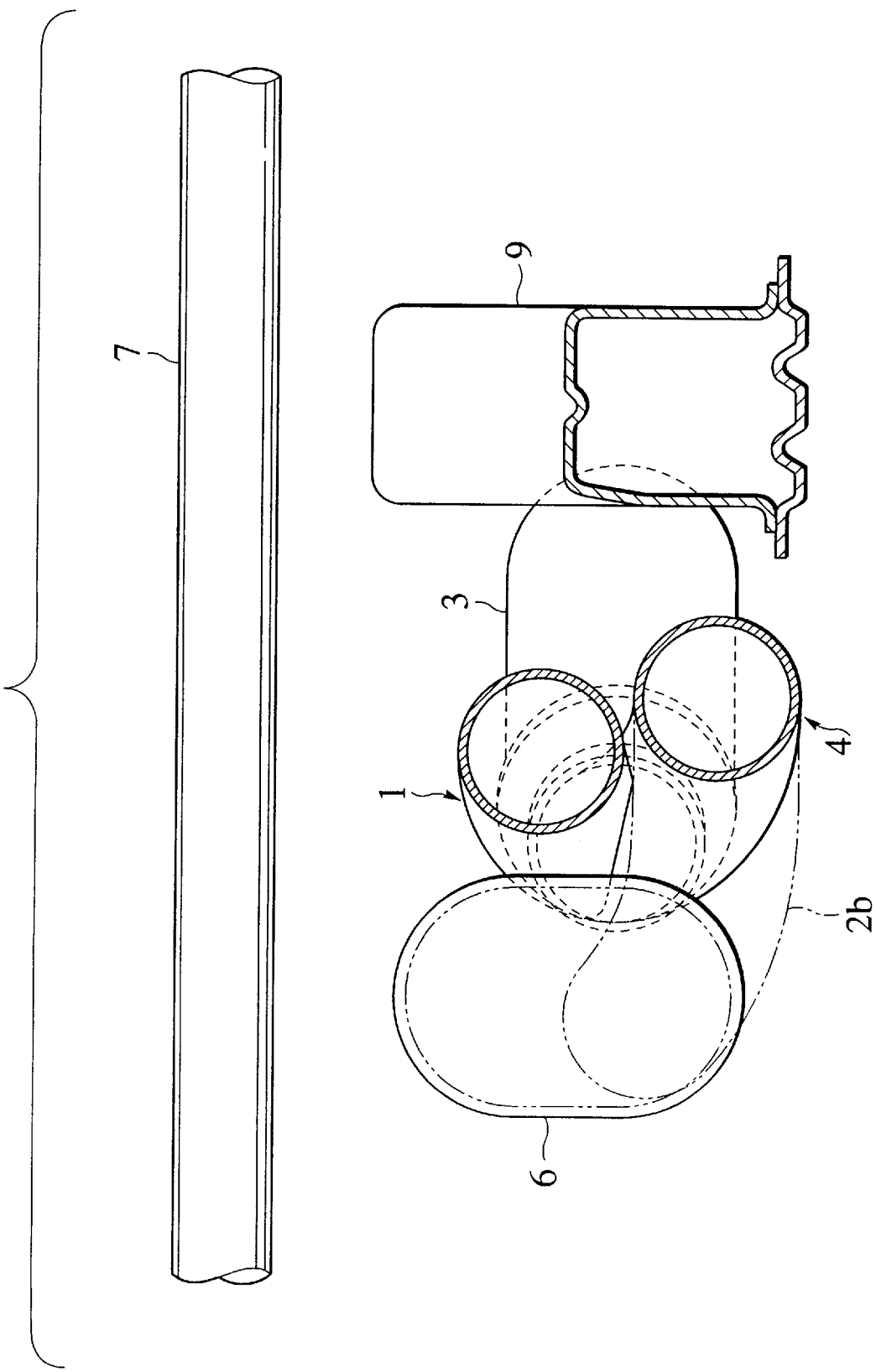

EXHAUST PIPE STRUCTURE FOR VEHICLE

The contents of Application No. TOKUGANHEI 9-361456 filed on Dec. 26, 1997 in Japan is hereby incorporated by reference.

BACKGROUND OF THE INVENTION

The present invention relates to an exhaust pipe structure for a vehicle, and more particularly, to an exhaust pipe structure suitable for an engine body having a front engine block and a rear engine block.

A related exhaust pipe structure for a vehicle includes a front exhaust pipe connected to a front engine block, a rear exhaust pipe connected to a rear engine block and an exhaust collecting chamber (see Japanese Patent Application Laid-open No. 60-50216). The front exhaust pipe extends from a front portion of an engine body, curves downward and extends rearward of the vehicle body. The rear exhaust pipe extends downward and curves rearward such as to form an L-shape. The front and rear exhaust pipes are connected to the exhaust collecting chamber which is connected to a main exhaust pipe.

SUMMARY OF THE INVENTION

In the above structure, however, lengths of the front and rear exhaust pipes are different. Therefore, there is a possibility that vibration noises having different natural frequencies between the front and rear exhaust pipes, and sound vibration performance is deteriorated. Further, there is a possibility that exhaust pulsation is disordered in the exhaust collecting chamber where exhaust gas flowing through the front and rear exhaust pipes join, and output is declined.

Therefore, it is an object of the present invention to provide an exhaust pipe structure for a vehicle engine capable of enhancing the sound vibration performance, and avoiding a declination of output due to disorder of exhaust pulsation.

To achieve the above object, according to the present invention, an exhaust pipe structure for a vehicle comprises a front exhaust pipe, a rear exhaust pipe and a confluence portion. The front exhaust pipe extends downward from a front portion of an engine and curves rearward. The rear exhaust pipe has an upstream portion and a downstream portion. The upstream portion extends downward from a rear portion of the engine. The downstream portion extends forward from a lower end of the upstream portion and curves rearward. The rear exhaust pipe has substantially the same length as that of the front exhaust pipe. Rear ends of the front and rear exhaust pipes are joined at the confluence portion.

In the above structure, the rear exhaust pipe from the rear portion of the engine includes the downstream portion extending forward from the lower end of the upstream portion and curving rearward, and is formed to have substantially the same length as the front exhaust pipe. Therefore, natural frequencies of the front and rear exhaust pipes are substantially aligned, vibration due to resonance is reduced, and the sound vibration performance is enhanced.

Further, since the front and rear exhaust pipes have substantially the same length, disorder of exhaust pulsation in the confluence portion of both the exhaust pipes is prevented from being generated, and output is enhanced.

BRIEF DESCRIPTION OF THE DRAWINGS

FIG. 3 is a sectional view taken along the line III—III in FIG. 1.

DESCRIPTION OF THE PREFERRED EMBODIMENT

An embodiment of the present invention is described in detail with reference to the drawings below.

Figure 1:
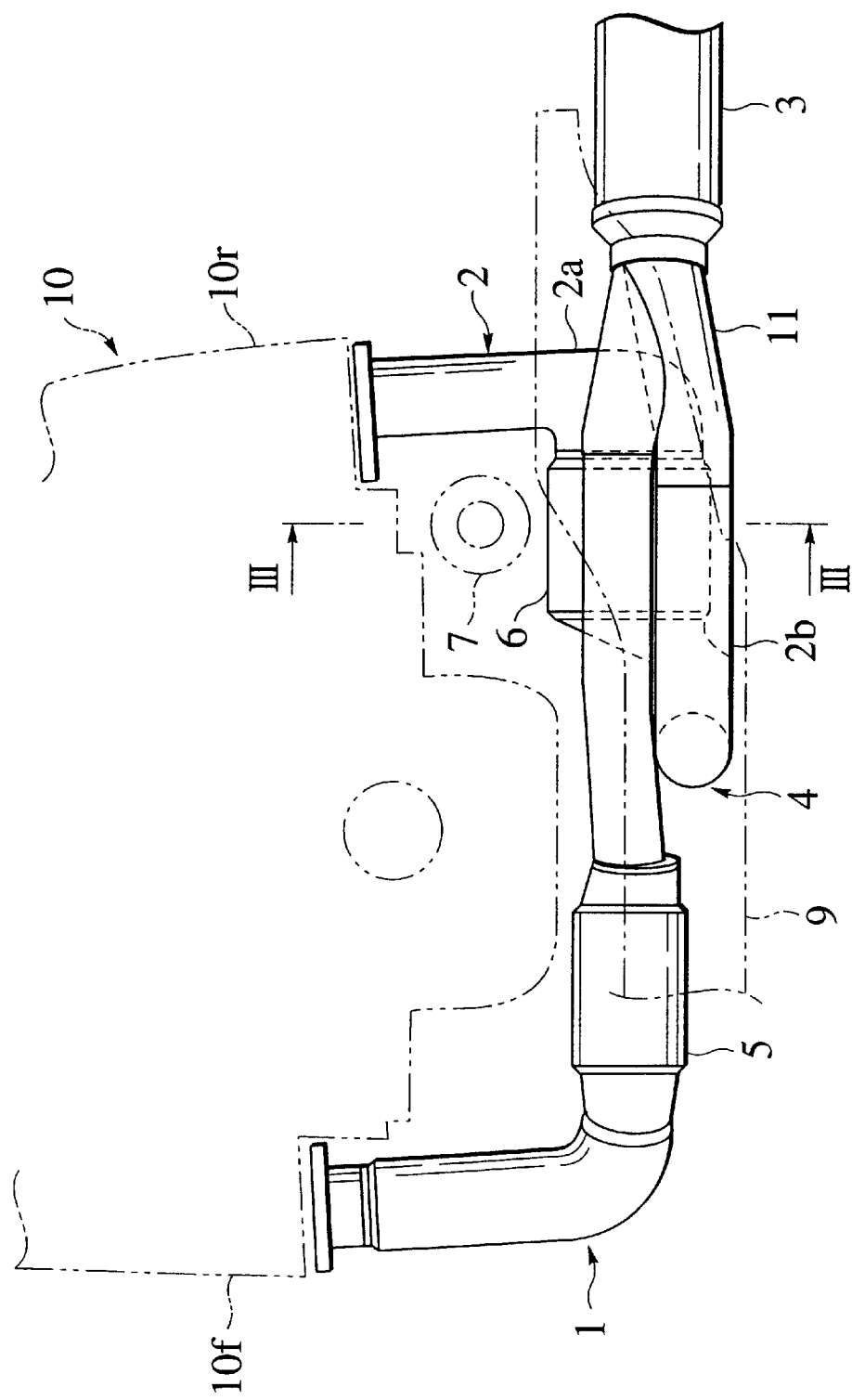
FIG. 1 is an explanatory side view showing an embodiment of the present invention.
Figure 2:
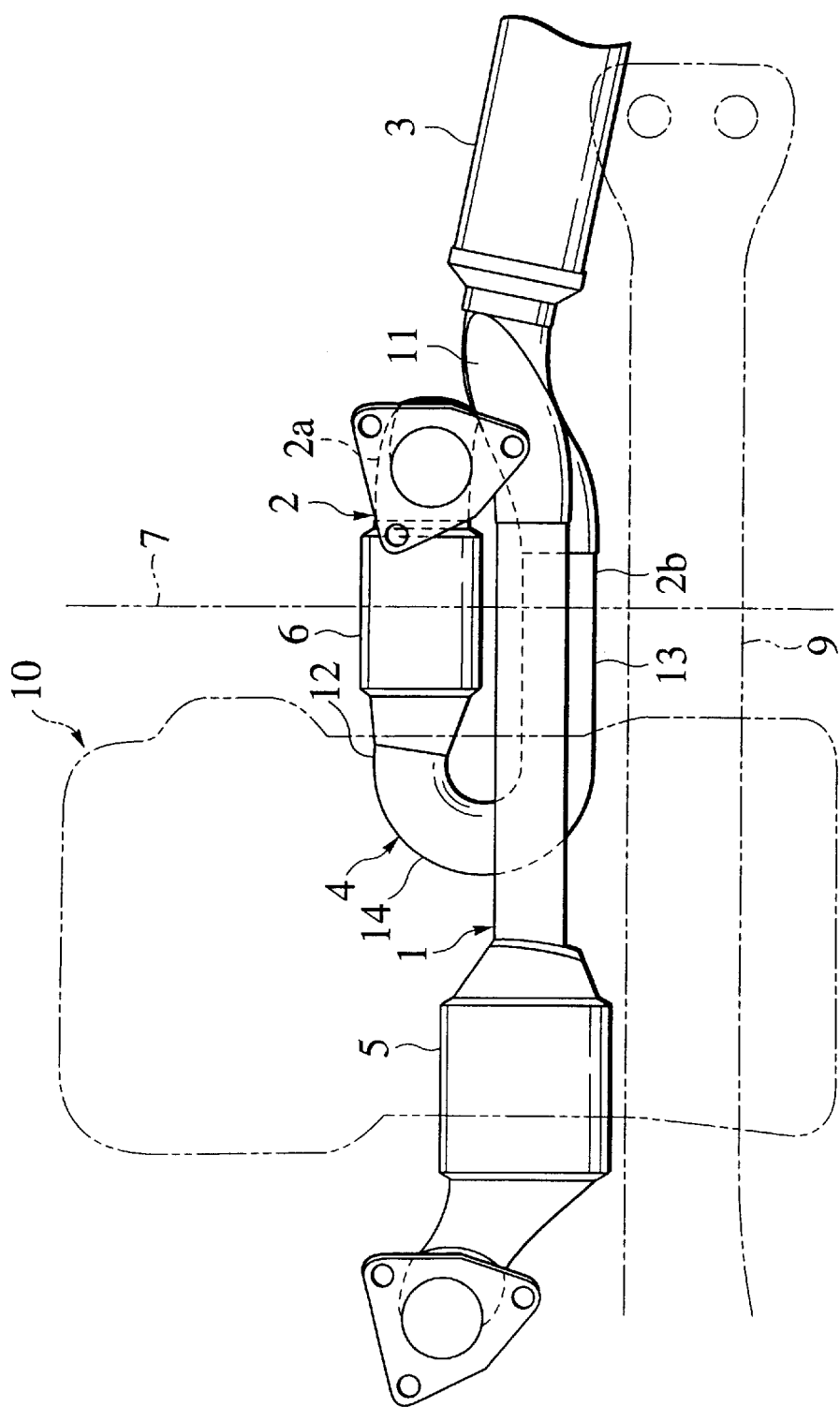
FIG. 2 is an explanatory plan view of the embodiment.

As shown in FIGS. 1 to 3, a front exhaust pipe 1 is connected to a front engine block 10f of an engine body 10. The front exhaust pipe 1 extends from a front side of the engine body 10 downward, and extends rearward of a vehicle body substantially horizontally.

A rear exhaust pipe 2 is connected to a rear engine block 10r of the engine body 10. The rear exhaust pipe 2 includes an upstream portion 2a extending downward from the rear engine block 10r, and a downstream portion 2b extending from a lower end of the upstream portion 2a forward substantially in horizontally and curving rearward.

Rear ends of the front exhaust pipe 1 and the rear exhaust pipe 2 are joined together In a state that the rear ends abut against each other from diagonal directions, and are united into one. A rear end of a confluence portion 11 of the front and rear exhaust pipes 1 and 2 is connected to a front end of a main exhaust pipe 3.

The downstream portion 2b of the rear exhaust pipe 2 includes a substantially U-shaped bent portion 4 projecting move forward in the vehicle body than the lower end of the upstream portion 2a. The bent portion 4 includes first and second extended portions 12 and 13 extending forward and rearward, and a curved portion 14 connecting front ends of the extended portions 12 and 13 (see FIG. 2). The front and rear exhaust pipes 1 and 2 are formed to have substantially the same length. The second extended portion 13 is located downstream from the first extended portion 12 and closer to the central portion of an engine than the first extended portion 12.

More specifically, the confluence portion 11 of the front and rear exhaust pipes 1 and 2 is located in the best position where a vibration effect in the vicinity of a rear engine mount installing portion (not shown) becomes smaller. Therefore, the radius of curvature of the bent portion 4 and a projecting size are set such that a length from the upper end of the rear exhaust pipe 2 (which is connected to the rear engine block 10r) to the rear end of the rear exhaust pipe 2 (confluence portion 11) is substantially the same as a length from the upper end of the front exhaust pipe 1 (which is connected to the front engine block 10f) to the rear end of the front exhaust pipe 1 (confluence portion 11).

The front and rear exhaust pipes 1 and 2 are provided with catalyzers 5 and 6 as exhaust gas purifying apparatuses, respectively. The catalyzer 6 of the rear exhaust pipe 2 is provided in an intermediate portion of the first extended portion 12 of the bent portion 4. The second extended portion 13 is disposed at a side of the catalyzer 6, and is superposed below the front exhaust pipe 1.

The catalyzer 6 is disposed substantially vertically below the front axle 7. The catalyzer 6 has an oval-shaped cross-section, and its longer diameter is directed in substantially a vertical direction. The exhaust pipe 1 and the second extended portion 13 are accommodated within a side projection of the catalyzer 6.

With the above structure, the rear exhaust pipe 2 is provided at its horizontally extending downstream portion 2b with the bent portion 4 projecting forward than the lower end of the upstream portion 2a, and the rear exhaust pipe 2 is adjusted such as to have substantially the same length as the front exhaust pipe 1 by the bent portion 4. Therefore, natural frequencies of the front and rear exhaust pipes 1 and 2 are substantially aligned, vibration due to resonance is reduced, and the sound vibration performance is enhanced.

Further, since the front and rear exhaust pipes 1 and 2 have substantially the same lengths, disorder of exhaust pulsation in the confluence portion 11 of the front and rear exhaust pipes 1 and 2 is prevented from being generated, and the output is enhanced.

In the present embodiment, the second extended portion 13 of the rear exhaust pipe 2 is disposed at a side of the catalyzer 6 of the first extended portion 12. Further, the second extended portion 13 and the front exhaust pipe 1 are superposed on each other up and down so that the exhaust pipe 1 and the second extended portion 13 are accommodated within a side projection of the catalyzer 6. Therefore, occupied spaces in the widthwise direction and in the vertical direction of the front exhaust pipe 1 and the second extended portion 13 can be reduced to the utmost, and a flexibility in arrangement layout of other functional parts in the engine room is enhanced.

Further, since the front exhaust pipe 1 and the second extended portion 13 are superposed on each other up and down, it is possible to prevent the exhaust pipe line from spreading laterally. Therefore, in a vehicle having a center member (shown by phantom lines in FIGS. 1 to 3) 9, a flexibility in arrangement layout of the exhaust pipes 1 and 2, and the center member 9 is enhanced.

Since the second extended portion 13 of the bent portion 4 is disposed below the front exhaust pipe 1, it is possible to increase the radius of curvature of the bent portion 4 to the utmost. Therefore, the ventilation resistance in the bent portion 4 is suppressed from increasing.

Furthermore, the catalyzer 6 is disposed below the front axle 7 having small height variation from ground at the time of bound and rebound when the vehicle is running. Therefore, the catalyzer 6 and the second extended portion 13 disposed at the side of the catalyzer 6 are prevented from interfering with a road surface.

What is claimed is:

1. An exhaust pipe structure for a vehicle, comprising:
    a front exhaust pipe extending downward from a front portion of an engine and curving rearward;
    a rear exhaust pipe having an upstream portion extending downward from a rear portion of the engine and a downstream portion that includes a first extended portion extending forward from the lower end of the upstream portion, a second extended portion, and a curved portion connecting front ends of the first and second extended portions, the rear exhaust pipe having a length that is substantially the same as that of the front exhaust pipe; and
    a confluence portion of rear ends of the front and rear exhaust pipes the second extended portion of the downstream portion of the rear exhaust pipe extending forward from the confluence portion.

2. An exhaust pipe structure according to claim 1, wherein the front exhaust pipe and the second extended portion are superposed up and down on each other.

3. An exhaust pipe structure according to claim 1, further comprising:
    an exhaust purifying apparatus disposed in the first extended portion.

4. An exhaust pipe structure according to claim 3 wherein the second extended portion is disposed below the front exhaust pipe.

5. An exhaust pipe structure according to claim 3 wherein the exhaust purifying apparatus is disposed below a front axle.

6. An exhaust pipe structure according to claim 1, wherein the engine comprises a front engine block and a rear engine block,
    the front exhaust pipe is connected to the front engine block, and
    the rear exhaust pipe is connected to the rear engine block.

7. An exhaust pipe structure for an engine of a vehicle, comprising:
    a front exhaust means for discharging exhaust gas from a front portion of the engine, the front exhaust means extending downward, and curving and extending rearward;
    a rear exhaust means for discharging exhaust gas from a rear portion of the engine, the rear exhaust means comprising an upstream portion extending downward from a rear portion of the engine and a downstream portion that includes a first extended portion extending forward from the lower end of the upstream portion, a second extended portion, and a curved portion connecting front ends of the first and second extended portions the rear exhaust means having a length that is substantially the same as that of the front exhaust means; and
    a confluence portion of rear ends of the front and rear exhaust pipes, the second extended portion of the downstream portion of the rear exhaust means extending forward from the confluence portion.

8. An exhaust pipe structure for use in a vehicle having an engine with a front and a rear engine block, the pipe structure comprising:
    a front exhaust pipe extending adapted to extend downward from the front engine block and curving rearward;
    a rear exhaust pipe comprising:
        an upstream portion adapted to extend downward from the rear engine block;
        a downstream portion extending forward from an end of the upstream portion, the downstream portion including:
            a first extended portion extending forward from the end of the upstream portion;
            a U-shaped portion connected at an end to a forward end of the first extended portion and bending downward; and
            a second extended portion having a forward end connected to a second end of the U-shaped portion and extending rearward from the bent portion,
        wherein a length of the rear exhaust pipe is substantially the same as that of the front exhaust pipe; and
    a confluence portion coupling a rearward end of the front exhaust pipe and a rearward end of the second extended portion of the rear exhaust pipe and adapted to be connected to a main exhaust pipe.

9. An exhaust pipe structure as claimed in claim 8, further comprising:
    a first exhaust purifying apparatus disposed in the front exhaust pipe; and
    a second exhaust purifying apparatus disposed in the first extended portion of the rear exhaust pipe and adapted to be disposed below a front axle of the vehicle.

* * * * *